United States Patent
Heinke et al.

(10) Patent No.: US 7,721,259 B2
(45) Date of Patent: May 18, 2010

(54) CONFIGURABLE AND CUSTOMIZABLE SOFTWARE APPLICATION SYSTEM AND METADATA

(75) Inventors: Joel Heinke, Livermore, CA (US); Chris Van Loben Sels, San Francisco, CA (US); Charles Horne, Orinda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1060 days.

(21) Appl. No.: 11/402,122

(22) Filed: Apr. 10, 2006

(65) Prior Publication Data

US 2007/0168962 A1    Jul. 19, 2007

Related U.S. Application Data

(60) Provisional application No. 60/737,069, filed on Nov. 15, 2005.

(51) Int. Cl.
G06F 9/44 (2006.01)
G06F 9/45 (2006.01)

(52) U.S. Cl. .................. 717/121; 717/120; 717/122
(58) Field of Classification Search .......... 717/120–126
See application file for complete search history.

(56) References Cited

U.S. PATENT DOCUMENTS

| | | | | |
|---|---|---|---|---|
| 6,256,773 | B1* | 7/2001 | Bowman-Amuah | 717/121 |
| 6,308,178 | B1* | 10/2001 | Chang et al. | 707/100 |
| 6,694,508 | B1* | 2/2004 | Moore et al. | 717/121 |
| 6,701,517 | B1* | 3/2004 | Moore et al. | 717/121 |
| 6,754,773 | B2* | 6/2004 | Ulrich et al. | 711/118 |
| 6,775,829 | B1* | 8/2004 | Kroening | 717/175 |
| 6,859,922 | B1* | 2/2005 | Baker et al. | 717/125 |
| 6,981,242 | B2* | 12/2005 | Lehmeier et al. | 717/122 |
| 7,133,874 | B2* | 11/2006 | Hill et al. | 707/102 |
| 7,219,332 | B2* | 5/2007 | Gouge et al. | 717/121 |
| 7,353,494 | B2* | 4/2008 | Nielsen et al. | 717/116 |
| 7,383,534 | B1* | 6/2008 | Agbabian et al. | 717/120 |
| 7,383,535 | B1* | 6/2008 | Kshetrapal et al. | 717/122 |
| 7,434,203 | B2* | 10/2008 | Stienhans et al. | 717/120 |
| 7,500,225 | B2* | 3/2009 | Khan et al. | 717/124 |
| 7,562,346 | B2* | 7/2009 | Jhanwar et al. | 717/120 |
| 7,562,347 | B2* | 7/2009 | Baumgart et al. | 717/120 |
| 7,565,643 | B1* | 7/2009 | Sweet et al. | 717/121 |
| 7,603,658 | B2* | 10/2009 | Subramanian et al. | 717/126 |

OTHER PUBLICATIONS

Wyss et al, "Relational languages for metadata integration", ACM Trans. on Database Sys. vol. 30, No. 2, pp. 624-660, 2005.*

(Continued)

*Primary Examiner*—Anil Khatri
(74) *Attorney, Agent, or Firm*—Townsend and Townsend and Crew LLP (57) ABSTRACT

Systems and methods of generating and executing customized variants of a software application are provided. The customized variants include customization of user interfaces, data processing logic, and data models. Customization is accomplished by overlaying custom metadata on base metadata. The base metadata characterizes the software application and the custom metadata characterizes variants of the software application. The custom metadata and base metadata have an object-oriented relationship. Related variants are optionally applied as a set to assure compatibility between variants of the same software application.

23 Claims, 3 Drawing Sheets

OTHER PUBLICATIONS

Kurniawan et al, " An IDE framework for grid application development", IEEE, pp. 184-191, 2008.*

Adl-Tabatabai et al, "Prefetch injection based on hardware monitoring and object metadata", ACM PLDI, pp. 267-276, 2004.*

Eijkhout et al, "A standard and software for numerical metadata", ACM Trans. on Mathematical Software, vol. 35, No. 4, article 25, pp. 1-20, 2009.*

Friedrich, "Mata-data version and configuration management in multi vendor environments", ACM SIGMOD, pp. 799-804, 2005.*

Bainbridge et al, "Assembling and enriching digital libraray collection", IEEE, pp. 323-334, 2003.*

* cited by examiner

CONFIGURABLE AND CUSTOMIZABLE SOFTWARE APPLICATION SYSTEM AND METADATA

BACKGROUND OF THE INVENTION

Embodiments of the invention generally relate to computer processing systems and software. More specifically, embodiments of the invention relate to configurable software systems.

Generally, large scale software applications are developed to provide support for practices and processes needed for the operation of an organization. For example, a company often procures packaged "Ready to Use" software applications designed to help the company manage business needs such as payroll, manufacturing, scheduling, etc. Such packaged software applications are often procured from software companies who write, debug and compile the software application.

To benefit from the economics of scale, consistent with the marketing practices in many industries, such software companies seek to develop generic software application packages that cover a broad range of software application needs. Due to variations in business practices and operations of different types of industries, such as electronic manufacturing, chemical manufacturing, real estate sales, etc., software applications are often tailored and packaged to suit a particular type of industry, business sector, etc.

Unfortunately, due to the virtually unlimited practices and operational variations between different types of industries, businesses, business units, business operations, and end-user needs, etc., the packaged software application generally does not perfectly match a particular company's, or even a particular industry's operational needs. For example, consider the case of a United States based company that manufactures electronic equipment. The company procures a software application designed to assist them in their United States based electronic equipment manufacturing operation. This software application is designed with features and options that work for the electronic manufacturing side of their business. Then, after the company has implemented the software application, the company may acquire an overseas subsidiary. Unfortunately, the same software application that worked for the electronic equipment manufacturing part of the business may be partially or wholly incompatible with the overseas subsidiary. This incompatibility may arise because of different customs, laws, because the overseas subsidiary is in a different industry, and/or because the overseas subsidiary is involved in a different part of the business.

The customization often required to satisfy the needs of varying business practices and operations involves more than just changes in end-user interfaces. This customization often requires changes in underlying system logic, data processing or data structures. Therefore, systems which merely allow customization of an end-user interface do not satisfy these needs.

Companies generally have three options with regard to packaged software applications that do not meet their operational needs. First, the company can try to upgrade the software application to an updated version (if available) that can support their operations. Second, the company can try to adapt itself to work with the software application without modification. Or third, the company may attempt to customize the software application to more closely match their overall operational needs. Unfortunately, all three options require some level of company adaptation and are, therefore, generally costly to implement and time consuming.

When a company chooses to customize their software application, this customization may not be compatible with later upgrades to the original software. The customization may also result in significant costs for merging different customizations or retraining end-users to use a newer version. In addition, a customization requested by one department within a company may not be accepted or endorsed by other departments or end users who are affected by the customization. For example, a department operating under one set of accounting rules may not support a customization needed by a department operating under another set of accounting rules.

The business software industry has provided some conventional solutions to incompatibilities with software applications. For example, software companies developing enterprise software have developed conventional software tools to allow a company to customize their software application to more closely match company business practices. Unfortunately, such conventional software tools are either limited to configuration of an end-user interface or require skilled computer programmers and/or highly trained personnel to implement changes to the software application.

Further, due to the complex nature and interrelationships between various software modules of the software application, customizing a software application often has a ripple effect. For example, customizing one department's data processing rules may cause other software modules and processes to operate differently or may even provide faulty information to other users of the software application. Generally, the solution to this type of problem has been for the company and/or the software developer to go through lengthy and expensive processes of testing the customizations and then releasing verified versions of the software application. Unfortunately, the process of software change verification, unless carefully controlled, can lead to numerous business infrastructure issues and a loss of business productivity. Therefore, many companies are reluctant to make changes to their software applications due to such ripple effect, especially once they believe that the software application is operating at an acceptable level. In the above example of an electronics manufacturing company with both US and oversees operations, this approach requires maintaining two different sets of software programs to accommodate the various needs of the US and overseas operations.

Therefore, there is a need for improved methods and systems that allow for customization of a software application, including underlying data processing and data structures, in an uncomplicated and efficient manner. There is also a need for systems that allow a user to simply and easily modify a software application to suit particular needs without adversely affecting other users thereof.

BRIEF SUMMARY OF THE INVENTION

Embodiments of the invention include systems and methods for a business analyst, end-user or administrator to customize a software application. Specifically, the customization can include variation of underlying data processing logic and/or data model, in addition to a user interface. The customization is optionally evaluated in real-time during execution of the software application and may be responsive to a wide range of execution contexts.

The customization is facilitated by several layers within the software application. At one layer is base metadata included in the software application prior to customization, as shipped by a developer or vendor of the software application. The base metadata can be categorized into three areas, base rules, base classes and base pages. Base metadata in the base rules category is configured to define data processing logic. Base metadata in the base classes category is configured to define all or part of a data model (e.g., data structures and data manipulation). Base metadata in the base pages category is configured to define aspects of a user interface.

One or more custom metadata can be overlaid on the base metadata in order to customize the software application. The overlaid custom metadata has an object-oriented relationship with the base metadata. For example, a custom rule metadata can be overlaid on base rules metadata in order to add to or alter data processing logic defined by the base rules metadata. Because of the object-oriented relationship between the custom rule metadata and the base rules metadata, the custom rule metadata inherits properties of the base rules metadata. Thus, the combination of base metadata and a custom metadata includes all attributes of the base metadata except those explicitly overruled by the custom metadata, as well as any new definitions included in the custom metadata.

The process of overlaying custom metadata on base metadata can occur at runtime of a software application. Thus, in contrast with traditional object-oriented programming, the assembly of objects (e.g., custom metadata and base metadata) can be responsive to the context in which the software application is executed. Further, because custom metadata and base metadata are assembled at runtime, a software application can be customized with regard to data processing logic, data models, and other properties that are traditionally fixed in binary executable code prior to execution of the software application.

In one embodiment, a software application may include one or more variants, each associated with the same base metadata and different custom metadata. Further, each variant may be configured for use under different execution contexts. For example, one variant may be configured for use when the execution context includes a first parameter and another variant may be configured for use when the execution context includes a second parameter.

As is discussed further herein, the selection and assembly of a software application variant can occur at runtime of the software application. For example, in some embodiments, a specific instance of a software application may include several different customized variants of a specific processing module, each variant being defined by a different set of custom metadata. These variants of the specific processing module may have, for example, been customized for use by different divisions or departments within an organization. The preferred variant can be determined at runtime based on execution context.

The selection and development of custom metadata may be constrained by further metadata, which is configured to assure that the custom metadata, in combination with the base metadata, result in a logical and self-consistent system. The metadata configured for constraining custom metadata includes constraint metadata configured to limit custom metadata based on how these rules would impact a specific software application variant, and also relationship metadata configured to limit custom metadata based on relationships between variants of the same software application.

While some examples discussed herein are focused on the customization of processing logic by laying a specific type of custom metadata over base metadata, they are equally applicable to the customization of data models and user interfaces by laying custom metadata over base class metadata and base page metadata, respectively.

Some embodiments of the invention include an application configuration system comprising a metadata analyzer, a metadata validator, a metadata packager, a metadata constructor and a context evaluator. These system elements are configured to generate an executable software application using various metadata, or the like, as described further herein.

DETAILED DESCRIPTION OF THE INVENTION

A software application configuration tool is provided that allows a user to customize interfaces, data processing logic and/or a data model of a software application. The customization is optionally responsive to one or more execution contexts in which the customized software application is executed. These execution contexts include the identity of an end-user or client, a particular access device, a particular location, a particular time, a particular subset of an organization, a particular security level, a particular industry, a particular software version, a particular business profile, or the like. Customization of a software application is accomplished by defining one or more customizations and overlaying these customizations on base metadata. For the purpose of example, these customizations are assumed to be represented by custom metadata. However, in alternative embodiments, the customizations are represented using other means of expressing logic, data models, etc. For example, the customization may be represented by mathematical or logic symbols, by pseudo-code, by scripts, by computer code, by a flowchart, by an equation, by a data structure, by a graphical arrangement of icons, or the like. Custom metadata may be used to describe, for example, data values, data models, interfaces, execution process flow, and/or logical operations on data.

The software application configuration tool provides the user of the tool with the ability to define or modify the custom metadata used to generate a software application variant. For example, a user may use the application configuration tool to modify an existing set of custom metadata associated with a first variant of a software application, and thus generate a second variant. The defined or modified sets of metadata are referred to as metadata variants of the software application. A metadata variant may be generated by defining new custom metadata and/or selecting previously existing custom metadata for inclusion in a set of metadata associated with a specific variant.

Constraints are used to restrict the values and content of custom metadata that can be defined using the software application configuration tool or laid over a specific base metadata. For example, in some embodiments constraints are configured such that modifications are limited to changes approved by a software testing procedure so that the new metadata variant can be executed without the need for further testing or quality control analysis. In some embodiments constraints are configured such that metadata variants are comprised of preexisting custom metadata parts that have been independently tested. In some embodiments, constraints are configured such that data processing logic can be customized but not data models, or vice versa.

Constraints may be expressed using additional metadata, and may be defined by a designer/developer of the software application. The constraints may be configured to assure that new or selected custom metadata is logically consistent and does not adversely affect other metadata variants. Thus, the constraints determine the extent to which user interfaces, data processing logic and/or data models of the software application can be customized.

In some embodiments, the software application configuration tool allows the user to evaluate the effects that a new metadata variant may have on other metadata variants of the same software application before executing the software application with the new metadata variant. For example, the software application configuration tool may be configured to highlight potential areas of conflict between metadata variants, to illustrate how one metadata variant can affect another metadata variant, and to identify areas where additional software testing is desirable.

In one embodiment, the software application configuration tool provides users with software functions to label metadata variants with an identifier for associating the metadata variants with different execution contexts. For example, metadata variants used to generate software applications for different divisions of an organization or for use in different locations may be given different identifiers to differentiate the metadata variants used by each division or each location.

In another embodiment, the user may use the software application configuration tool to generate one or more metadata packages from metadata variants. The metadata packages contain the elements of a metadata variant required for execution of that variant. A metadata package can optionally be deployed separately from other variants of the same software application. The metadata packages may also be used to rapidly identify the elements (e.g., custom metadata and base metadata) of a specific variant that are required at runtime.

Figure 1:
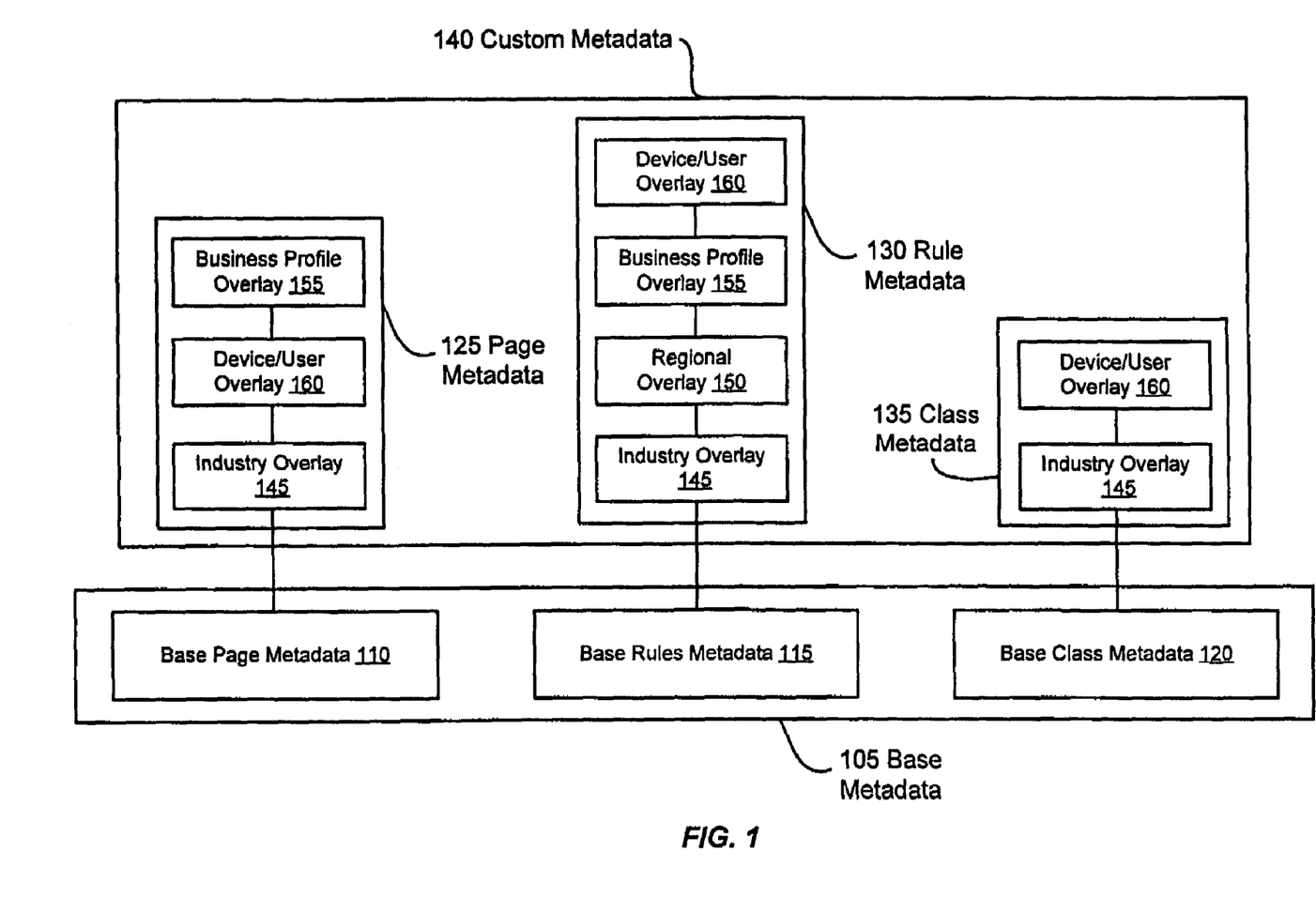
FIG. 1 is a block diagram illustrating object-oriented relationships between elements of a software application, according to various embodiments of the invention.

FIG. 1 is a block diagram illustrating object-oriented relationships between elements of a software application. Base Metadata 105 includes at least Base Page Metadata 110, Base Rules Metadata 115 or Base Class Metadata 120. Base Page Metadata 110 is configured to define a user interface for use by an end-user of a software application. These definitions can include the layout of individual interface pages, connections between interface pages, navigation between individual interface pages, and the like. For example, Base Page Metadata 110 may be used to define the layout of elements on an interface page configured to be displayed in a browser, and associations between those interface elements and procedures of a software application.

Base Rules Metadata 115 is configured to define logical processes within a software application. For example, Base Rules Metadata 115 can include definitions of how a value should be calculated, which operations should be evoked in response to data entered by an end-user, what values should be compared in a Boolean test, criteria for a conditional branch in execution flow, and the like.

Base Class Metadata 120 is configured to define a data model for use by a software application. For example, Base Class Metadata 120 can include definitions of various classes of data objects, data structures, data records, data fields, query tools, query language, or the like.

Base Page Metadata 110, Base Rules Metadata 115 or Base Class Metadata 120 can each be overlaid by one or more further layer of Page Metadata 125, Rule Metadata 130, or Class Metadata 135, respectively. Page Metadata 125, Rule Metadata 130, and Class Metadata 135 are collectively referred to as Custom Metadata 140. For example, Base Class Metadata 120 may be overlaid by Class Metadata 135, wherein the overlaid Class Metadata 135 represents new aspects of a data model. The overlays may add to or negate definitions included in the Base Metadata 105. Each unique overlay of Custom Metadata 140 represents a custom variant of the software application.

Typically, Custom Metadata 140 and Base Metadata 105 are treated as definition objects. When Custom Page Metadata 125, Custom Rules Metadata 1130 and/or Custom Class Metadata 135 are laid over Base Metadata 105 they inherit attributes of the Base Metadata 105. For example, if a definition is included in Base Metadata 105 but not Custom Metadata 140 then the Custom Metadata 140 inherits this definition. Further, if a definition in Base Metadata 105 is contradicted by a definition in overlaid Custom Metadata 140, then the definition in the Custom Metadata 140 prevails.

Page Metadata 125 and Base Page Metadata 110 are differentiated from Rule Metadata 130 and Base Rules Metadata 115. For example, Page Metadata 125 is normally associated with an end-user interface while Rule Metadata 130 is typically independent of any end-user interface. Further, Rule Metadata 130 can involve data processing of data other than that entered in an end-user interface. In some embodiments, Page Metadata 125 and Rule Metadata 130 are distinguished in that Page Metadata 125 may be responsive to the particular user interface employed by and end-user while Rule Metadata 130 is less likely to be so.

Multiple layers of Custom Metadata 140 may be overlaid on a specific instance of Base Metadata 105. In FIG. 1 several illustrative examples are shown. These examples include several Industry Overlays 145, a Regional Overlay 150, several Business Profile Overlays 155 and several Device/User Overlays 160. Each successive overlay is treated as another definition object. For example, in FIG. 1, an instance of Industry Overlay 145 is overlaid on Base Class Metadata 120 and inherits the attributes of this Base Class Metadata 120. An instance of Device/User Overlay 160 is overlaid on the Industry Overlay 145 and thus inherits the attributes of both Base Class Metadata 120 and Industry Overlay 145.

The contents of each overlay are typically configured dependent on the type of Base Metadata 105 on which it is to be overlaid. Thus, the contents of the instance of Industry Overlay 145, overlaid on Base Page Metadata 110 would normally be different than the contents of Industry Overlay 145 overlaid on Base Rules Metadata 115. Differences in Base Metadata 105 constitute different software applications. Differences in Custom Data 140 may constitute different variants of the same software application.

Figure 2:
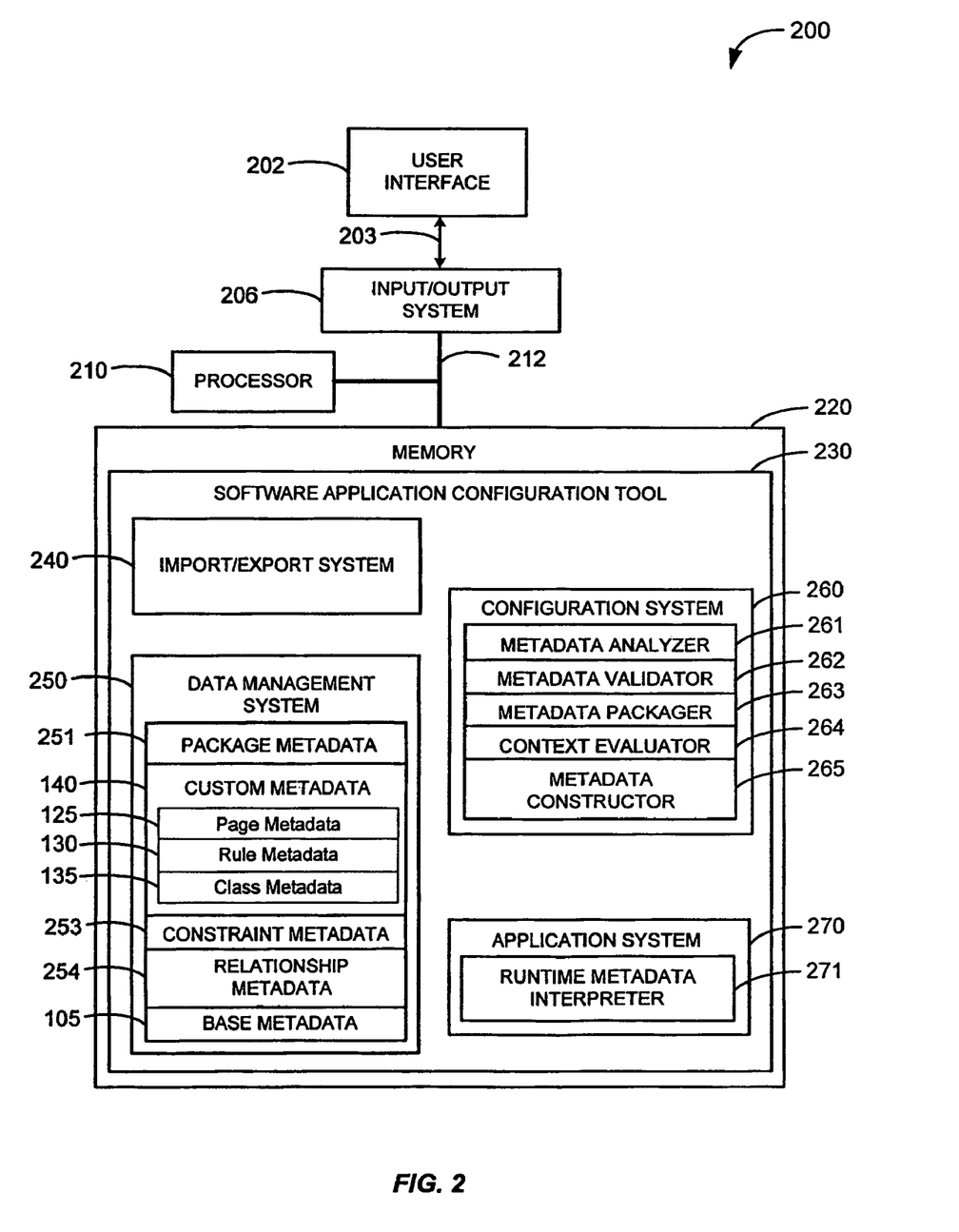
FIG. 2 is a block diagram of a configurable software application system, according to various embodiments of the invention.

FIG. 2 is a block diagram of a Configurable Software Application System generally designated 200. In various embodiments, Configurable Software Application System 200 includes a User Interface 202, an Input/Output System 206, a Processor 210, and a Memory 220. User Interface 202 is coupled to Input/Output System 206 via an I/O Signal 203. User Interface 202 can be any device or combination of devices adapted for exchanging information between a user of User Interface 202 and other elements of Configurable Software Application System 200. For example, User Interface 202 may include a keyboard, keypad, light-pen, touch-screen, track-ball, or speech recognition system. User Interface 202 optionally includes a conventional display screen (e.g., computer monitor) and optionally includes a web browser. Input/Output System 206, Processor 210, and Memory 220 are coupled via a Communication System 212. Communication System 212 optionally includes a bus, a computer network, or one or more electrical and/or optical communication elements. For example, in some embodiments, Communication System 212 includes a computer network.

Input/Output System 206 is configured to provide a communication interface between User Interface 202 and Processor 210, and/or Memory 220. For example, Input/Output System 206 is optionally configured to output data to Communication System 212 in response to data received from User Interface 202. In another example, the Input/Output System 206 is optionally configured to receive data from Communication System 212, using a Hypertext Transfer Protocol (HTTP). Data received through Input/Output System 206 is optionally configured for display using a web browser (not shown) in User Interface 202.

Processor 210 may run a variety of software applications, and may include one or more separate integrated circuits. Processor 210 is configured to support one or more software applications described herein, including a Software Application Configuration Tool 230.

Memory 220 includes one or more long term and/or short term memory devices. For example, in various embodiments, Memory 220 includes a direct access storage device, a fixed disc drive, a floppy disc drive, a tape drive, a removable memory card, an optical storage, or the like. Memory 220 is optionally a combination of fixed and/or removable storage devices. Memory 220 optionally further comprises one or a combination of memory devices, including Random Access Memory (RAM), nonvolatile or backup memory, (e.g., programmable or flash memories, read-only memories, and the like). In one embodiment, Memory 220 contains a database used to store data such as various metadata, application data, and the like.

Memory 220 is configured to store Software Application Configuration Tool 230 configured for generation of customized metadata variants of a software application. For example, the metadata variants may be generated to meet a variety of business conditions. By using metadata variants to meet different needs, software applications are modified to meet these needs without having to write additional software code and recompile and test all or part of the software application. These different needs are optionally related to different execution contexts. For example, the execution contexts may include different business conditions generally characterized by factors that affect the operation of a business. Such factors may include where the business is physically located (i.e., geographic location), laws governing the business, business practices, taxes, personnel, payroll, security, shipping, inventory, operational variations between different business units (e.g., finance, sales, marketing, manufacturing, etc.), identity of an end-user or client, and the like.

In typical embodiments, Software Application Configuration Tool 230 is configured for a user to develop a different version (e.g., variant) of a software application. In order to do so, Software Application Configuration Tool 230 provides the user with the ability to overlay new or previously existing Custom Metadata 140, representative of custom processing rules, custom page rules and/or custom class rules, on existing Base Metadata 105. Custom Metadata 140 can, for example, add new processing logic or change processing logic of Base Rules Metadata 115.

As discussed further herein, the development and use of Custom Metadata 140 is restricted in several ways by Software Application Configuration Tool 230. For example, Custom Metadata 140 may be limited to use in particular execution contexts and should be safe to use in the sense that the resulting variant will not adversely or unpredictably affect the software application. In some embodiments, Software Application Configuration Tool 230 is configured to package metadata variants into deployable metadata packages. The metadata packages may be deployed using Configurable Software Application System 200, for example, through Communication System 212, to produce an executable variant of the software application. Users of Software Application Configuration Tool 230 may include end-users, system administrators, installation engineers, database managers, IT managers, or the like.

In various embodiments, Software Application Configuration Tool 230 includes an Import/Export System 240, a Data Management System 250, a Configuration System 260, and/or an Application System 270. Import/Export System 240 is configured to import and/or export data, including metadata, application data, and the like, via Communication System 212. For example, a user may enter a metadata variant via User Interface 202. The Input/Output System 206 receives the metadata variant and transmits the metadata variant to the Import/Export System 240 for processing.

Data Management System 250 is configured to store various types of metadata and optionally application data to be processed by a software application variant. For example, Data Management System 250 stores Custom Metadata 140 and Constraint Metadata 253 for use by Configuration System 260. Constraint Metadata 253 is typically defined by a developer of a software application, a senior administrator, or a party with an understanding of the scope of metadata variants that could be produced without requiring significant further software testing or approval.

In some embodiments, Constraint Metadata 253 is configured for producing Custom Metadata 140 whose impact on a software application can be reasonably predicted without the use of further testing and quality control procedures. For example, Constraint Metadata 253 can be configured to allow a change in a calculation that includes several new steps required to account for a new tax rule. However, the same Constraint Metadata 253 can be configured to prevent the use of Custom Metadata 140 that would result in the use of a negative tax rate. In another example, Constraint Metadata 253 can be configured to allow a user to store and make use of intermediate results in a calculation, but not to skip generation of these intermediate results. In another example, Constraint Metadata 253 can be configured to allow a user to add a field to a data model, but not to remove an index field from the data model.

In some embodiments, Constraint Metadata 253 is specified in response to a software testing procedure. For example, if application development included testing the software application with a series of tax rate values between 0 and 100%, then Constraint Metadata 253 is optionally specified to only allow tax rates within the tested range.

In various embodiments, Data Management System 250 further includes Package Metadata 251, Relationship Metadata 254, and Base Metadata 105, in addition to Custom Metadata 140 and Constraint Metadata 253. Package Metadata 251 describes (e.g., identifies) which metadata is required by a specific variant of a software application. For example, Package Metadata 251 can be used to describe the Custom Metadata 140 and Base Metadata 105 that are required by one or more metadata variants.

The Custom Metadata 140 described by Package Metadata 251 is optionally responsive to execution context. For example, if the execution context includes a geographic location such as the country of Australia, the Custom Metadata 140 described by Package Metadata 251 can characterize custom processing rules consistent with the execution of the software application in Australia. Likewise, if the execution context includes a specific industry, then the Custom Metadata 140 described by Package Metadata 251 should be consistent with execution of the software application in that industry.

Relationship Metadata 254 is used to express and control relationships between different metadata instances or variant instances of a software application. A single software application can include more than one variant. For example, an accounting system used by a large corporation may include several variants that share the same Base Rules Metadata 115 or Base Class Metadata 120, but constitute different variants because each includes different Custom Metadata 140 to express differences due to locales or due to periodic changes in accounting rules, etc. Like other metadata, relationship data may change by variant.

In various embodiments, Relationship Metadata 254 describes the relationships of metadata within one metadata variant to metadata within another metadata variant. For example, Relationship Metadata 254 may describe a data record that two different metadata variants both operate on, inputs and outputs expected between two different metadata variants, metadata shared by two different metadata variants, or the like. For example, in various embodiments, Relationship Metadata 254 is configured to describe that two different metadata variants each share a data record, that two different metadata variants each share some Base Metadata 105, or that two different metadata variants share some Custom Metadata 140.

In various embodiments, Relationship Metadata 254 includes a characterization of different variants in terms of their development history. For example, in some embodiments, Relationship Metadata 254 may include an expression of which software application variants were derived from each other. In these embodiments software application variants are considered to be daughters and/or parents of each other in hierarchical relationships descending from an original version of the software application based on Base Metadata 105. For example, a daughter of the original version may include one layer of Custom Metadata 140 laid over the Base Metadata 105, two granddaughters of the original version may include two different second layers of Custom Metadata 140 laid over the first layer and Base Metadata 105, etc. Thus, Relationship Metadata 254 may characterize a tree structure of software application variants.

Relationship Metadata 254 is optionally configured to further limit the scope of Custom Metadata 140. For example, if a first metadata variant writes an interest rate value to a data record and another metadata variant reads from that data record, then new Custom Metadata 140 that were to cause the first metadata variant to write a monthly payment value, instead of interest rate, to the data record would cause a conflict between the two metadata variants. Such potential conflicts are identified using Relationship Metadata 254, and once identified the proposed Custom Metadata 140 is blocked from being added to the first metadata variant.

Configuration System 260 includes tools for a user of Software Application Configuration Tool 230 to develop metadata variants for inclusion in variants of a software application. For example, in some embodiments, Configuration System 260 includes a Metadata Analyzer 261, a Metadata Validator 262, a Metadata Packager 263, a Context Evaluator 264, and a Metadata Constructor 265. Metadata Analyzer 261 is configured to determine if a proposed custom rule represented by Custom Metadata 140 is compatible with the limitations imposed by Constraint Metadata 253 and Relationship Metadata 254. This determination is optionally performed in response to receipt of proposed Custom Metadata 140 from an administrator or end-user, etc., during a process of customization. For example, in some embodiments Metadata Analyzer 261 is used to check whether proposed Custom Metadata 140 would generate data outside of an allowed range or delete data required by other metadata variants. Proposed Custom Metadata 140 can further be invalid because of errors in syntax or incompatibility with specific Base Metadata 105. Thus, proposed Custom Metadata 140 may be valid when overlaid on a first instance of Base Metadata 105, but not valid when overlaid on a second instance of Base Metadata 105.

Metadata Validator 262 is configured to confirm that Base Metadata 105 and Custom Metadata 140 assembled at runtime by Metadata Constructor 265 result in a logically valid and self-consistent set. Thus, the self-consistency of Custom Metadata 140 is assured using Constraint Metadata 253 and optionally Relationship Metadata 254 when Custom Metadata 140 is generated, and optionally again by Metadata Validator 262 at runtime. The checks made by Metadata Validator 262 assure that the assembly of the Base Metadata 105 and Custom Metadata 140 has occurred properly. The checks can also be used in systems wherein Constraint Metadata 253 and Relationship Metadata 254 may be altered. For example, if Constraint Metadata 253 is changed then Custom Metadata 140 that was previously valid may become invalid. Changing Constraint Metadata 253 or Relationship Metadata 254 may be desirable to fix a bug or allow a larger scope of customization.

The Metadata Packager 263 is configured to determine which Custom Metadata 140 and Base Metadata 105 are needed to generate an executable variant of a software application. This determination may occur either at runtime or prior to runtime. Metadata Packager 263 is optionally further configured to deploy specific variants of the software application separately from other variants.

The Context Evaluator 264 is configured to determine which Custom Metadata 140 should be used to overlay Base Metadata 105 of a software application, as a function of the execution context of the software application at runtime. Typically, Context Evaluator 264 first receives the current execution context via Communication System 212. Parameters within the execution context are used to indicate context factors such as the location of execution (e.g., Australia or the United States, Calif., San Francisco, etc.), division within an organization (e.g., sales or manufacturing), or the like. These parameters are compared with the requirements of specific variants of the software application as indicated by Package Metadata 251. This comparison is used to determine which variant of the software application to execute. In some embodiments, if no previously packaged variant is found then Context Evaluator 264 is configured to look at individual instances of Custom Metadata 140 in order to attempt to assemble an executable variant of the software application. Thus, Context Evaluator 264 may select one set of Custom Metadata 140 from a plurality of possible sets of Custom Metadata 140 responsive to a specific execution context parameter.

Metadata Constructor 265 is configured to assemble the various metadata required at runtime as determined by Context Evaluator 264, to produce a software application variant. For example, Metadata Constructor 265 will assemble Custom Metadata 140 and integrate the assembled metadata as an overlay to Base Metadata 105. In alternative embodiments, Metadata Constructor 265 may assemble the various metadata prior to runtime or at runtime.

In some embodiments, Application System 270 is configured to receive a request for execution of a software application and to manage execution of an appropriate variant thereof. Included in Application System 270 is a Runtime Metadata Interpreter 271 configured to convert Custom Metadata 140 and Base Metadata 105 to executable instructions (e.g., code, scripts, or the like), for execution. In some embodiments, these executable code, scripts, or the like, include HTML or XML for use in User Interface 202.

Figure 3:
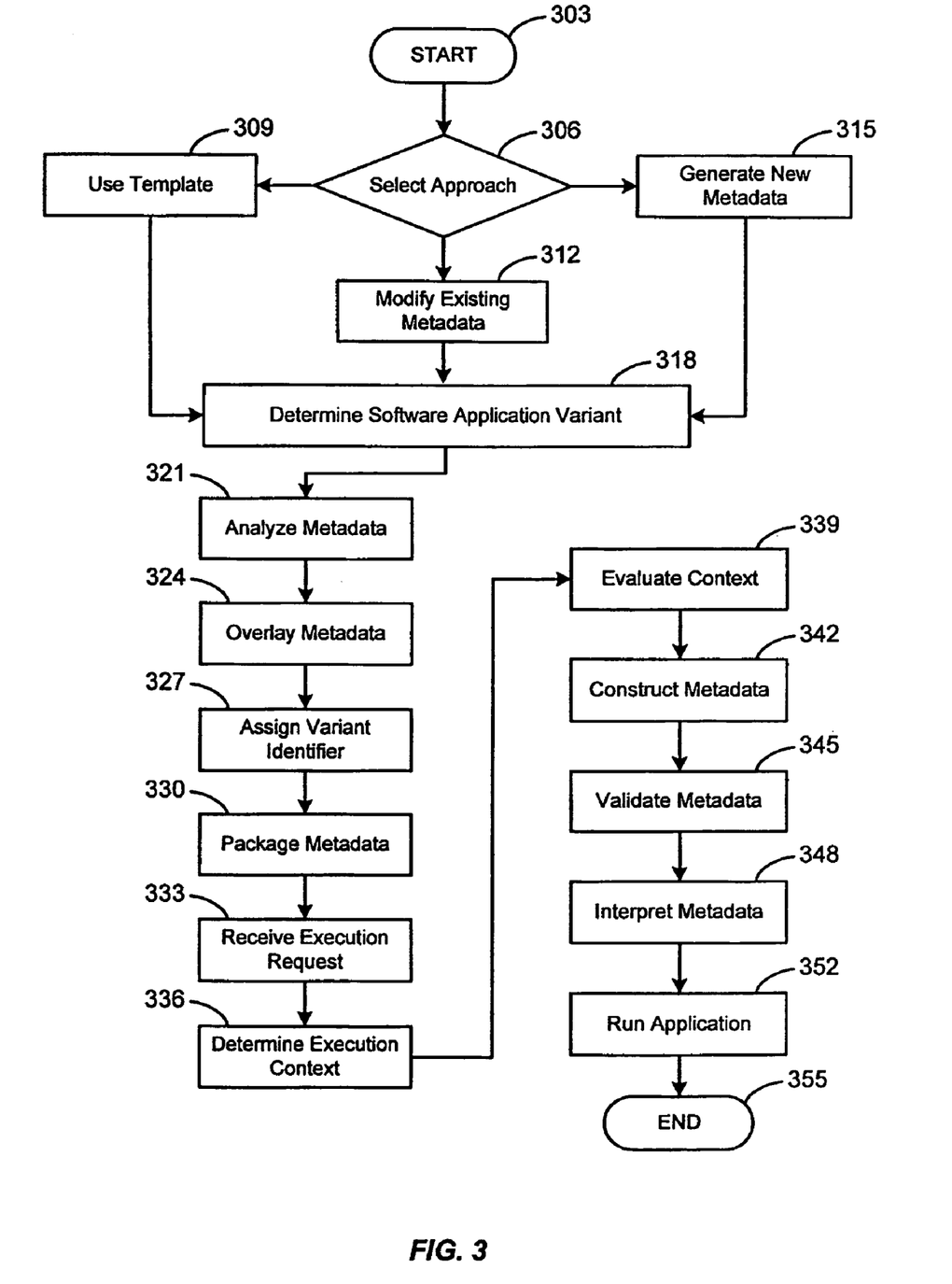
FIG. 3 is a flowchart illustrating a method of configuring and/or executing a software application, according to various embodiments of the invention.

FIG. 3 is a flowchart illustrating various methods of embodiments of the invention. These methods may be initiated at a Step 303 when, for example, Software Application Configuration Tool 230 is operated by a user thereof. In a Step 306 the user has an option of selecting three alternative approaches to generating new Custom Metadata 140. These methods include use of a custom metadata template, modification of previously existing Custom Metadata 140, or direct generation of new Custom Metadata 140. Various combinations of these options are available in different embodiments of the invention.

If the user selects to use a custom metadata template, then the method proceeds to a Use Template Step 309. In Use Template Step 309 a template is provided to the user, optionally through User Interface 202 (FIG. 2). The template includes one or more fields in which the user can enter instructions (e.g., logic operations, mathematical operators, I/O operations, or the like), as well as the names of variables within the software application. Typically, the template is configured to allow the user to formulate new Custom Metadata 140 while avoiding syntax errors or logical errors. In some embodiments, the template includes a graphical representation of processing logic, data structures, or a user interface page. Optionally, the template is responsive to Constraint Metadata 253 and/or Relationship Metadata 254. In these cases the template may be configured to guide the user toward defining new Custom Metadata 140 that satisfies the requirements of Constraint Metadata 253 and/or Relationship Metadata 254.

If the user selects to use existing Custom Metadata 140 for the generation of new Custom Metadata, then the method of FIG. 3 proceeds to a Modify Existing Metadata Step 312. In Modify Existing Metadata Step 312 previously existing Custom Metadata 140 is selected and read from Data Management System 250. In some embodiments, this selection is facilitated by using a query. The selected Custom Metadata 140 is presented to the user for editing. This presentation can be graphical or textual. The user may be given an option of overwriting the previously existing Custom Metadata 140 with the edited version or saving the edited version as separate new Custom Metadata 140. If the edited version is saved separately it is normally assigned an identifier and optionally descriptive information so that it is easily later retrieved.

If the user selects to directly generate new Custom Metadata 140, then the method of FIG. 3 proceeds to a Generate New Metadata Step 315. In Generate New Metadata Step 315 the user can directly enter logic, metadata, pseudo code, or the like to define new Custom Metadata 140.

Once new Custom Metadata 140 has been generated it can be saved for later use or immediately associated with a software application variant. In some embodiments the new Custom Metadata 140 is automatically checked for syntax as part of the above steps. New Custom Metadata 140 may already be associated with a software application variant if it was used to overwrite previously existing Custom Metadata 140. In this case, it will be associated with the same software application variant as the overwritten Custom Metadata 140.

If the new Custom Metadata 140 is not yet associated with a software application variant, then an association is made in a Determine Software Application Variant Step 318. In Step 318 the user can associate the new Custom Metadata 140 with a software application variant by entering an identifier of the software application variant, identifying the software application variant using a query, or selecting the software application variant from a list.

In some embodiments, a user can search for software application variants based on execution context parameters associated with the variant. For example, a software application variant may be configured for use in a specific location and with a specific business profile, as defined by instances of Regional Overlay 150 and Business Profile Overlay 155, respectively. The user can search for this software application variant using parameters characterizing the specific location and business profile. For example, a search for "New Zealand" and "drive thru restaurant" can identify software application variants associated with those parameters.

In an Analyze Metadata Step 321, the new Custom Metadata 140 is analyzed using Metadata Analyzer 261. The analysis includes determination of whether the new Custom Metadata 140 is within the requirements of Constraint Metadata 253 and/or Relationship Metadata 254. The testing of some types of requirements require that the new Custom Metadata 140 already be associated with a software application variant, while other types of requirements are independent of any associated software application variant. For example, a requirement that a square root not be taken of a negative value is independent of any associated software application variant.

The testing of most requirements, of Constraint Metadata 253 and/or Relationship Metadata 254, is made responsive to an associated software application variant because the tests are made in the context of Base Metadata 105 and other levels of Custom Metadata 140 already associated with that software application variant. For example, if the new Custom Metadata 140 being analyzed is Rule Metadata 130, then the new Custom Metadata 140 is analyzed with consideration of any attributes of Base Rules Metadata 115 inherited by the new Custom Metadata 140. Further, if there are other layers of Rule Metadata 130 associated with the software application variant, the analysis is carried out with consideration of any attributes that may be inherited from or passed to these other layers of Rule Metadata 130.

In some embodiments, the analysis of one type of Custom Metadata 140 is made with consideration of other types of metadata. For example, if the new Custom Metadata 140 is Rule Metadata 130 then the analysis further includes consideration of Page Metadata 125, Class Metadata 135, Base Page Metadata 110 and Base Class Metadata 120.

In some embodiments, the analysis of new Custom Metadata 140 is also responsive to Relationship Metadata 254. In these embodiments, the analysis of new Custom Metadata 140 is made with consideration of Custom Metadata 140 and/or Base Metadata 105 associated with other software application variants.

If it is determined in Analyze Metadata Step 321 that the new Custom Metadata 140 violates a constraint defined by Constraint Metadata 253 or Relationship Metadata 254, then the user is optionally notified. The user may also be offered an opportunity to alter the new Custom Metadata 140 in order to avoid the identified violations. In some embodiments, any changes to previously existing Constraint Metadata 253 are rolled back.

In an optional Overlay Metadata Step 324 the new Custom Metadata 140 is overlaid over Base Metadata 105 in order to form a new software application variant. As discussed elsewhere herein, the overlay process includes inheritance of attributes from Custom Metadata 140 and Base Metadata at lower levels. Overlay Metadata Step 324 is optional when the new Custom Metadata 140 was a direct replacement for previously existing Custom Metadata 140, in which case the overlay may have already occurred. For example, in instances where the new Custom Metadata 140 is a replacement of previously existing Custom Metadata 140 an additional software application variant may not be generated. Further, in these instances there may be layers of Custom Metadata 140 already layered above the previously existing Custom Metadata 140. These layers will now inherit attributes of the new Custom Metadata 140 as substitutes for any attributes that were previously inherited from the replaced Custom Metadata.

If a new software application variant was generated in Overlay Metadata Step 324, then the new software application variant is assigned an identifier in Assign Variant Identifier Step 327. This identifier is optionally associated with execution context parameters configured for identifying under which execution contexts the new software application variant should be executed. The association between execution context parameters and the identifier is optionally established in Assign Variant Identifier Step 327 or at a later time.

In an optional Package Metadata Step 330, the various Base Metadata 105 and Custom Metadata 140 required in a software application variant are identified. This information may be stored in a table as Package Metadata 251 for quick access at runtime. Package Metadata 251 may also be used to generate software application variants that can be deployed separately from the rest of the software application.

In a Receive Execution Request Step 333, a request for execution of a software application is received from an end-user. This request can be accompanied by execution context parameters. For example, if the end-user has a known identity, location, business unit, organizational division, or the like, this information can be received as execution context parameters with the request for execution. The various execution context parameters can include data entered by the end-user, data associated with an account of the end-user, data associated with a client computing device, data associated with a source of the execution request, or the like. For example, a client computing device located in the accounting department of an office located in Denver optionally has the department and location set as default parameters.

In a Determine Execution Context Step 336 the received execution context is passed to Context Evaluator 264 for parsing and parameter identification.

In an Evaluate Context Step 339, the context parameters are used to identify which Base Metadata 105 and Custom Metadata 140 should be included in the requested execution. In some embodiments, this identification is performed by comparing the received context parameters with context parameters associated with a specific software application variant as indicated by Package Metadata 251. This comparison is optionally performed using a query on Data Management System 250. In some embodiments, this identification is performed by comparing the received context parameters with context parameters associated with individual or groups of Custom Metadata 140. Again, this comparison can be performed using a query.

In a Construct Metadata Step 342, the metadata identified in Evaluate Context Step 339 is assembled by Metadata Constructor 265. The assembled metadata is optionally assembled in a manner such that each layer can be processed sequentially and the inheritance of attributes between layers managed. For example, in some embodiments, Base Rules Metadata 115 is assembled to be logically adjacent to the first layer of Rule Metadata 130, and the first layer of Rule Metadata 130 is assembled to be logically adjacent to the second layer of Rule Metadata 130, etc.

In an optional Validate Metadata Step 345, the validity of the assembled metadata is checked. Validation is typically subject to Constraint Metadata 253 and/or Relationship Metadata 254, and optionally subject to further runtime constraints. Validate Metadata Step 345 optionally includes tests to confirm the logical self-consistency of the assembled metadata, to confirm that the assembled metadata has not been corrupted, or the like. In contrast with Analyze Metadata Step 321, Validate Metadata Step 345 is performed in response to an execution request received in Receive Execution Request Step 333.

In an optional Interpret Metadata Step 348 the assembled metadata is interpreted using Runtime Metadata Interpreter 271. The interpretation includes conversion of some or all of the assembled metadata to executable instructions. In some embodiments, this conversion occurs prior to delivery of the executable instructions via Communication System 212 to Input/Output System 206 or User Interface 202. In some embodiments, this conversion occurs following delivery of the assembled metadata via Communication System 212. The executable instructions can include scripts, binary code, XML, HTML, or the like. For example, in some embodiments, the interpretation can include conversion of Base Rules Metadata 115 and Rule Metadata 130 into binary code or CGI scripts. Interpret Metadata Step 348 is optional, for example, when the only metadata to be interpreted is Base Page Metadata 110 and Page Metadata 125 which is already configured for presentation in a browser.

In Run Application Step 352 the executable instructions produced in Interpret Metadata Step 348 is executed as part of the requested software application.

The methods illustrated in FIG. 3 are optionally divided into several parts which can be practiced independently. For example, the variant generation process of Steps 303 through 330 may be performed independently of the execution process of Steps 333 through 355. Typically, the execution process may be performed more often than the variant generation process.

In some embodiments of the invention Custom Metadata 140 is used to provide updates to existing software application in the form of a software patch. For example, if an improved version or bug fix needs to be disseminated to existing installations of a software application, then a developer can prepare Custom Metadata 140 that is configured to update the installed software application as needed. The prepared Custom Metadata 140 can then be delivered and integrated into the previously installed software application using the systems and methods discussed herein.

Several embodiments are specifically illustrated and/or described herein. However, it will be appreciated that modifications and variations are covered by the above teachings and within the scope of the appended claims without departing from the spirit and intended scope thereof. For example, in alternative embodiments, Base Metadata 105 and/or Custom Metadata 140 are replaced by other representations of computer processes. For example, Rule Metadata 130 may be replaced by other representations of data processing logic. Further, some Custom Metadata 140 may fit into more than one category. For example, an instance of Custom Metadata 140 can be both Rule Metadata 130 and Class Metadata 135. In alternative embodiments, aspects of Software Application Configuration Tool 230 are located on User Interface 202.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A configurable software application system comprising:
a processor; and
a memory coupled to the processor and configured to store
a software application configuration tool executable by the processor for generation of customized metadata variants of a software application, the software application configuration tool including:
base metadata configured to characterize data processing logic within the software application;
custom metadata configured to define a variant of the software application including custom data processing logic within the software application, the custom metadata data being configured to be overlaid on the base metadata and to inherit attributes of the base metadata;
a context evaluator configured to overlay the custom metadata on the base metadata in response to a request to execute the software application received from an end user, responsive to an execution context;
a runtime metadata interpreter configured to generate executable instructions for the software application using the base metadata and overlaid custom metadata at runtime; wherein the configuration system includes a metadata packager configured to determine that the custom metadata and the base metadata are needed to generate an executable variant of the software application; and
a metadata analyzer configured to determine if the first custom metadata meets the requirements of relationship metadata when overlaid on the base metadata.

2. The system of claim 1, further including a configuration system configured for a user of the configuration system to define the custom metadata.

3. The system of claim 2, wherein the configuration system includes a metadata analyzer configured to assure that the custom metadata satisfies constraint metadata.

4. The system of claim 1, wherein the metadata packager is responsive to an execution context parameter of the execution context.

5. The system of claim 1, further including relationship metadata configured to characterize relationships among metadata instances and metadata variant instances of the software application.

6. The system of claim 5, wherein the constraint and/or relationship metadata is configured to limit customization of the software application.

7. The system of claim 1, wherein the execution context includes a particular subset of an organization, a particular industry, or a particular business profile.

8. The system of claim 1, further including package metadata configured for identifying which metadata is required by the variant of the software application.

9. The system of claim 1, further including package metadata configured for deploying an independent variant of the software application.

10. A configurable software application system comprising:
a processor; and
a memory coupled to the processor and configured to store
a software application configuration tool executable by the processor for generation of customized metadata variants of a software application, the software application configuration tool including:
a context evaluator configured for selecting a first custom metadata from among a plurality of custom metadata responsive to an execution context of the software application, the first custom metadata configured to define a variant of the software application;
a metadata constructor configured to overlay the selected first custom metadata on base metadata, the first custom metadata being configured to inherit attributes of the base metadata, the base metadata characterizing the software application;
a metadata validator configured to assure that the base metadata and the overlaid first custom metadata are valid according to constraint metadata; and
a metadata analyzer configured to determine if the first custom metadata meets the requirements of relationship metadata when overlaid on the base metadata.

11. The system of claim 10, further including a metadata packager configured to determine which of the plurality of custom metadata is required to execute the variant of the software application.

12. The system of claim 10, wherein the metadata constructor is further configured to overlay second custom metadata on the first custom metadata and the base metadata in response to a request for execution of the software application.

13. The system of claim 10, wherein the first custom metadata is configured to customize data processing logic of the software application.

14. A method for generation of customized metadata variants of a software application, the method comprising:
generating, with a processor associated with a computing device, custom rule metadata configured to be overlaid on base rule metadata and to characterize a variant of the software application;
analyzing, with the processor associated with a computing device, the custom rule metadata and the base rule metadata with regard to constraint metadata; and
associating, with a processor associated with a computing device, the custom rule metadata with one or more execution context parameters, the execution context parameters being configured for selecting the custom rule metadata from among a plurality of custom rule metadata at runtime of the software application.

15. The method of claim 14, wherein the custom rule metadata and base rule metadata are configured to be converted to executable instructions using a runtime metadata interpreter.

16. The method of claim 14, further including analyzing the custom rule metadata and base rule metadata with regard to relationship metadata.

17. The method of claim 14, further including generating package metadata configured to identify metadata required to execute the variant of the software application.

18. The method of claim 14, further including providing the custom rule metadata as a patch to a software application.

19. A method for generation of customized metadata variants of a software application, the method comprising:

receiving, at a computing device, a request for execution of the software application from an end-user;

receiving, at a computing device, execution context parameters associated with the received request;

identifying, with a processor associated with the computing device, first custom metadata using the execution context parameters, the first custom metadata being configured to be overlaid on base metadata associated with the software application and being configured to define data processing logic;

overlaying, with a processor associated with the computing device, the identified first custom metadata on the base metadata;

determining, with a processor associated with the computing device, if the first custom metadata meets the requirements of relationship metadata when overlaid on the base metadata;

interpreting, with the processor associated with the computing device, the overlaid first custom metadata and base metadata at runtime of the software application, to generate executable instructions; and executing the executable instructions with one or more processors associated with one or more computing devices.

20. The method of claim 19, wherein identifying custom metadata using the execution context parameters includes using package metadata.

21. The method of claim 19, wherein the data processing logic is independent of any interface provided to the end-user.

22. The method of claim 19, further including identifying second custom metadata using the execution context parameters, overlaying the second custom metadata on the base metadata and the first metadata, and interpreting the overlaid second custom metadata along with the first custom metadata and the base metadata.

23. The method of claim 19, further including providing the executable instructions over a computer network to a user interface of the end-user.

* * * * *